Patented Sept. 4, 1934

1,972,521

UNITED STATES PATENT OFFICE 1,972,521

SYNTHETIC RESIN

John W. Iliff, Ridley Park, and Paul Robinson, Lansdowne, Pa., assignors to E. I. du Pont de Nemours & Company, Wilmington, Del., a corporation of Delaware No Drawing. Application March 25, 1930, Serial No. 438,900

8 Claims. (Cl. 260—8)

This invention relates to the art of plastics and coating compositions and more particularly to the production of synthetic resins and compositions containing them.

Synthetic resins have been made in a variety of ways, one of the most important of which is to react a polyhydric alcohol, such as glycerol, with a polybasic acid or its anhydride, such as phthalic anhydride, with or without modifying agents, such as monobasic acids, non-drying oils, or drying oil acis. While these methods have resulted in the production of useful resins, they have certain disadvantages, such as an undesirable darkening of the resulting product, a high cost, and variation of the resulting resin because of the non-uniformity of the drying oil acids available for use.

Another way of making oil modified polyhydric alcohol-polybasic acid resins is a method of making these synthetic resins from the mono and diglycerides prepared by the alcoholysis of drying and semi-drying oils with polyhydric alcohol. The esterification of these glycerides is then completed with a dibasic acid or its anhydride such as phthalic anhydride.

In the alcoholysis process just mentioned, the alcohol is heated with the oil until the alcohol goes into solution and the resulting product is then heated wth the dibasic acid until resinification takes place. While this method makes possible the preparation of oil modified polyhydric alcohol-polybasic acid resins, which are transparent and light in color, films laid down from these resins have, however, some tendency to become yellow when exposed even for a short time in poorly illuminated places. This disadvantage is also common to most oleo-resinous and synthetic oleo-resinous film-forming materials. The discoloration becomes more serious in warm and damp atmospheres.

This invention has as an object an improved method of making synthetic transparent resins capable of retaining their light color and transparency when applied as a coating material. A further object is to produce new and useful resins. It is a still further object to produce new compositions containing our new resins. With the above and other objects in view which will be apparent as the description proceeds, we have set forth the following examples by way of illustration and not as a limitation:

These objects are accomplished by the following invention, in which drying or semi-drying oil is given a preliminary bleaching treatment such as a pre-heating to heat polymerize the oil, the heating being effected in the absence of oxidizing gas until the oil is bleached and sufficiently altered so as to retain the initial light color imparted thereto. It is to be understood that by "bleached oil" we mean drying or semi-drying oils that have been subjected to the special heat-treating bleaching process described herein in addition to that which may incidentally take place in the various processes for refining these oils. The duration of this additional heat-treatment in the bleaching process is such that the markedly lighter color of the film laid down from the treated oil does not start to darken after several days as it does when the heat-treatment is not carried far enough. The films of the bleach oil comprehended herein are lighter in color and retain their light color for longer periods of time than those obtained from oils subjected to the ordinary refining processes. Alcoholysis of the treated oil is then brought about with a polyhydric alcohol and the mixture of glycerides so obtained is esterified with a dibasic acid such as phthalic acid or its anhydride, this last step giving the desired oil modified resin.

EXAMPLE I

| | |
|---|---|
| Alkali refined linseed oil | 59.2 |
| C. P. glycerol | 12.8 |
| Phthalic anhydride | 28.0 |
| | 100.0 |

The method of producing our improved resin from the above ingredients is as follows:

The linseed oil is heat-treated at 270° C. in an electrically heated covered aluminum kettle provided with a mechanical stirrer and an air cooled reflux condenser. A rapid current of carbon dioxide is bubbled thru the oil from the bottom of the kettle during the period of heat treatment which lasts about five hours. The viscosity of the oil increases slightly during this time and the color of the oil becomes considerably lighter. The reflux condenser is closed during this step, the gases being allowed to escape thru another opening. The oil is cooled to 250° C. and the glycerol is slowly added. The mixture is vigorously agitated at this temperature until the glycerol has gone into solution in the oil. About three and one-half hours are required for this to take place. The reflux condenser is used during this second step in order to retain the glycerol which vaporizes. The space above the liquid is kept filled with carbon dioxide. At this point the phthalic anhydride is added, preferably melted to avoid entrainment of air, and the heat treatment continued at the same temperature until an acid number below five is obtained. Carbon dioxide is bubbled thru the liquid at a fairly rapid rate during the third step. The resulting resin is a very pale yellow transparent liquid of about the same viscosity as honey.

Example II

The same proportions are used as in Example 1. The procedure is also the same except that the time of treating the oil in the first step is increased to fifteen hours. This gives a product with a high viscosity, somewhat more viscous than honey. It will retain its initial color slightly better than the resin of Example 1, but this improvement is gained at the expense of low viscosity.

Example III

| | |
|---|---:|
| Soya bean oil | 59.2 |
| C. P. glycerol | 12.8 |
| Phthalic anhydride | 28.0 |
| | 100.0 |

The same procedure is used as in Example 2. The final product is slightly less viscous than that of Example 2 but does not dry as rapidly.

Example IV

| | |
|---|---:|
| Alkali refined linseed oil | 72.9 |
| C. P. glycerol | 8.3 |
| Phthalic anhydride | 18.8 |
| | 100.0 |

The same procedure is used as in the case of Example 2. These proportions give a resin somewhat less viscous than molasses, but which does not become as hard on drying as the resins in the preceding examples.

Example V

| | |
|---|---:|
| Alkali refined linseed oil | 48.1 |
| Chinawood oil | 24.8 |
| C. P. glycerol | 8.3 |
| Phthalic anhydride | 18.8 |
| | 100.0 |

The same procedure is followed as in the case of Example 1 except that the temperature during the first stage is 260° C. and in the second and third stages is 225° C. The material is of about the same viscosity as the resin of Example 2. It dries more rapidly than the resins of the preceding examples.

The resins made in accordance with the invention disclosed herein may be made into a wide variety of compositions illustrative examples of which are set forth below.

Example VI

Non-yellowing white enamel

| | |
|---|---:|
| Lithopone | 150 |
| Zinc oxide | 50 |
| Resin of Example 1 | 100 |
| Mineral spirits | 55 |
| Drier | 1 |
| | 356 |

The above ingredients are combined according to the common practice in paint manufacture.

Example VII

Light colored transparent varnish

| | |
|---|---:|
| Resin of Example 5 | 100 |
| Turpentine | 75 |
| Manganese drier | 2 |
| | 177 |

If the above ingredients are thoroughly mixed a clear transparent varnish is produced which is suitable for use when it is desired to bring out the true color of the material being coated.

It is desirable in all three steps of the process of preparing the resins to maintain an atmosphere of inert gas such as carbon dioxide in the space above the liquid. During the first step it is advantageous to bubble a rapid current of gas thru the liquid to assist in carrying off volatile materials which are detrimental to color. Stirring is also desirable. Five hours is about the minimum time of treatment in the first step: treatment longer than fifteen hours at 270° C. results in a highly viscous product. In the second step, rapid stirring is desirable in order to maintain as large an area of contact as possible between the two liquid phases. This procedure decreases the time necessary for the reaction. It is also desirable to make this second step as short as possible in order to prevent excessive polymerization of the glycerides. When this is allowed to occur, the finished product has very high viscosity. The use of the condenser during the second step is important in order to prevent the loss of glycerol. Rapid agitation is also an advantage in the third step as it helps to remove the water of esterification and thereby speeds up the reaction. The material must be kept out of contact with air during all three steps.

The temperatures given in the above examples are the optimum ones for the resins in question. It will be understood, however, that the temperature ranges may vary somewhat depending upon conditions as will be understood by those skilled in the art.

As a general rule it appears that a temperature range of approximately 260° C. to approximately 290° C. is satisfactory for the first stage of the pre-heating treatment of the oil. For the second stage of the process in which the alcohol is reacted with the oil, satisfactory results may be obtained within the temperature range of approximately 190° C. to approximately 285° C. The third or resinification stage of the process may be satisfactorily effected within a temperature range of approximately 190° C. to approximately 260° C.

In the compositions of the type disclosed, the phthalic or other dibasic acid glyceride may vary from about 10% to 80%. When Chinawood oil is also used as an ingredient in making a resin, as in Example V, the content of the Chinawood oil may vary from about 1% to about 60% of the drying oil acid glyceride content. The drying oil acid glyceride content may be defined for the purposes of the present invention as that part of the resin which does not consist of the glycerides of phthalic or other polybasic acid. The most useful compositions, however, lie within the range specified in the examples.

Inorganic basic substances, such as sodium hydroxide, lime, litharge, etc. may be used as catalysts as described in the copending application previously referred to, but they darken the product slightly. The heat treatment of the oil may be carried out in a separate kettle and the resulting bleached oil transferred to the resin making kettle. The second and third steps may be also carried out in separate kettles if desired provided that the apparatus is arranged so as to effect the transfer from one kettle to another without allowing the hot material to come in contact with the air. Other inert gas as flue gas, may of course take the place of the carbon dioxide mentioned.

It is to be understood that other polyhydric alcohols, such as ethylene glycol, which are used as resin ingredients, may replace the glycerol mentioned in the examples. Any other drying or semi-drying oils and mixture thereof may also be used instead of those mentioned. It is also possible to replace glycerol with mixtures of alcohols, including mixtures of alcohols having less than three hydroxyl groups in conjunction with alcohols having more than two hydroxyl groups. Instead of phthalic anhydride other dibasic acids as succinic, fumaric, adipic and maleic, known as valuable ingredients for making resins may be used. It is sometimes desirable to use a mixture of polybasic and mono-basic acids and when this is done the mono-basic acid is preferably added in the second stage of the process.

The resins made as described in accordance with the invention disclosed herein are at least equal in drying, hardness, durability and water resistance to those made by methods already known. They are very light in initial color and retain their light color for long periods of time after having been applied as coating compositions.

Drying oil modified resins such as are described in this application find their most important uses in varnishes and enamels where transparency and light color are essential. Enamels known as mill whites intended for finishing walls and ceilings of factories and finishes for the inside of dwellings and offices are good examples. Transparent varnishes and lacquers may also be made from these resins. On the other hand, coating compositions based on these resins may be advantageously applied to a great variety of metal, wood, stone, concrete and composition surfaces intended for both inside and outside exposure, although the value of the invention is not so apparent unless the exposure is such that initial color and resistance to progressive yellowing need to be taken into consideration. With pigmented products the advantages are greater in the case of the whites and light tints, although in the solid colors brighter and truer shades can be obtained by the use of these resins.

These resins have also been found superior for many other purposes such as binders for granular or fibrous materials, laminated fabrics, molded plastics and safety glass.

As many apparent and widely different embodiments of this invention may be made without departing from the spirit thereof, it is to be understood that we do not limit ourselves to the foregoing examples or description except as indicated in the following claims.

We claim:

1. The process of preparing synthetic resins which comprises polymerizing and bleaching an oil of the drying or semi-drying type by heating it in the absence of oxidizing gas, heating a polyhydric alcohol with the bleached oil until the two phases merge into a single phase, and then heating the product thus obtained with an organic polybasic acid until resinification occurs.

2. The process of preparing synthetic resins which comprises polymerizing and bleaching linseed oil by heating it in the absence of oxidizing gas, heating glycerol with the bleached oil until the two phases merge into a single phase, and then heating the product thus obtained with phthalic anhydride.

3. The process of preparing synthetic resins which comprises heating an oil of the drying or semi-drying type within the range of 260° C.–290° C. in the absence of oxidizing gas until the oil is polymerized and retains the bleached lighter color imparted thereto, heating the bleached oil with glycerol within the range of 190° C.–285° C. until the two phases merge into a single phase and then heating the product thus obtained with phthalic anhydride within the range of 190° C.–260° C. until resinification occurs.

4. A process of preparing synthetic resins which comprises heating soya bean oil in the absence of oxidizing gas until the oil is polymerized and retains the bleached lighter color imparted thereto, heating a polyhydric alcohol with the polymerized and bleached oil until the two phases present merge into a single phase, and then heating the product thus obtained with an organic polybasic acid until resinification occurs.

5. A process of preparing synthetic resins which comprises heating soya bean oil at about 270° C. for approximately five hours in the absence of oxidizing gas, heating polyhydric alcohol with the polymerized and bleached oil thus produced until the two phases merge into a single phase, and then heating the product thus obtained with an organic polybasic acid until resinification occurs.

6. A light colored, rapid drying substantially non-yellowing resin comprising the reaction product of phthalic anhydride and the glyceride obtained by alcoholysis of heat polymerized and bleached soya bean oil with glycerol, the major portion of said resin consisting of said soya bean oil in chemically combined form.

7. The process set forth in claim 3 in which the polyhydric alcohol is glycerol and the polybasic acid is phthalic anhydride.

8. The process set forth in claim 4 in which the polyhydric alcohol is glycerol and the polybasic acid is phthalic anhydride.

JOHN W. ILIFF.
PAUL ROBINSON.